(12) United States Patent
Huang et al.

(10) Patent No.: US 11,841,191 B2
(45) Date of Patent: Dec. 12, 2023

(54) MAGNESIUM ALLOY MATERIAL SMELTING DEVICE

(71) Applicant: CITIC Dicastal Co., Ltd., Qinhuangdao (CN)

(72) Inventors: Lixin Huang, Qinhuangdao (CN); Shiwen Xu, Qinhuangdao (CN); Meng Li, Qinhuangdao (CN); Haiping Chang, Qinhuangdao (CN); Zhen Li, Qinhuangdao (CN); Zhen Peng, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 17/676,302

(22) Filed: Feb. 21, 2022

(65) Prior Publication Data

US 2023/0194176 A1 Jun. 22, 2023

(30) Foreign Application Priority Data

Dec. 20, 2021 (CN) .......................... 202111558969.7

(51) Int. Cl.
*F27D 27/00* (2010.01)
*C22C 1/03* (2006.01)

(52) U.S. Cl.
CPC ................ *F27D 27/00* (2013.01); *C22C 1/03* (2013.01); *F27M 2003/13* (2013.01)

(58) Field of Classification Search
CPC ........ F27D 27/00; C22C 1/03; F27M 2003/13

(Continued)

(56) References Cited

U.S. PATENT DOCUMENTS 2,781,260 A * 2/1957 Grandpierre .............. C21C 1/10
266/235
2,786,755 A * 3/1957 Paddock .................. B22D 1/00
75/708

(Continued)

FOREIGN PATENT DOCUMENTS

| JP | 2000212621 | * | 8/2000 | ............. F27D 27/00 |
| KR | 100697855 | * | 3/2007 | ............. F27D 27/00 |

*Primary Examiner* — Jessee R Roe
*Assistant Examiner* — Michael Aboagye
(74) *Attorney, Agent, or Firm* — IPro, PLLC

(57) ABSTRACT

The disclosure discloses a magnesium alloy material smelting device, comprising a furnace, a disc packing device, the disc packing device comprising a stirring shaft, a packing basket, a disc stirring head, the stirring shaft connected with a packing basket, the bottom of the packing basket connected with a disc stirring head, the disc stirring head comprising a plurality of stirring wings, the stirring wings connected with the packing basket and the stirring disc, the connecting ends of the stirring wings connected with each other, the stirring ends extending to the edge of the stirring disc, and the sidewall of the packing basket provided with a liquid passage hole; during the process of preparing and processing the magnesium alloy, the disc stirring head may accelerate the diffusion, the rotation of the disc stirring head may divide the melt into upper and lower layers, and the upper layer of the melt forms a solution vortex to accelerate the diffusion of the master alloy elements; the lower melt keeps relatively static to avoid the upturn of precipitated slag and shorten the precipitation time of slag, thereby improving the productivity.

9 Claims, 3 Drawing Sheets

(58) Field of Classification Search
USPC .................................... 266/233, 242, 235
See application file for complete search history.

(56) References Cited

U.S. PATENT DOCUMENTS

| 4,717,540 | A | * | 1/1988 | McRae | ................ | F27D 3/0026 |
| | | | | | | 266/233 |
| 6,508,977 | B2 | * | 1/2003 | Eckert | .................... | B01F 27/90 |
| | | | | | | 75/708 |

* cited by examiner

MAGNESIUM ALLOY MATERIAL SMELTING DEVICE

TECHNICAL FIELD

The disclosure herein relates to the technical field of alloy smelting, in particular to a magnesium alloy material smelting device.

BACKGROUND

Magnesium alloy is an alloy composed of magnesium and other elements. It is characterized by low density (about 1.8 g/cm$^3$), high strength, large elastic modulus, good heat dissipation, good shock dissipation, greater impact load bearing capacity than aluminum alloy, and good corrosion resistance to organic matter and alkali. The main alloying elements are aluminum, zinc, manganese, cerium, thorium and a small amount of zirconium or cadmium. Mg—Al alloy is the most widely used, followed by Mg—Mn alloy and Mg—Zn—Zr alloy. At present, with the development of science and technology, the requirements for new materials are improved, and the price of magnesium alloy is reduced and its superior properties make magnesium alloy applied in aviation, aerospace, transportation, chemical industry, rocket and other industrial fields.

However, the raw magnesium manufacturing technology in China is relatively backward, and the smelting and casting technology of magnesium alloy develops late, which leads to certain lagging with foreign advanced technology and the unstable quality of magnesium alloy products in China. Therefore, it is necessary to study the smelting technology of magnesium alloy. Due to the strong chemical activity of magnesium, the molten magnesium and oxygen in the air are easy to oxidize and even burn during the smelting process of magnesium and magnesium alloy. In order to prevent the oxidation and combustion of magnesium alloy, solvent protection, flame retardant protection and gas protection etc. are adopted during the smelting and casting process. These protection methods play different roles of protection during the smelting process of magnesium alloy. But even so, during preparing alloy, pure metal and master alloy need to be manually clamped and washed in solution, which leads to the continuous destruction of the covering layer formed on the surface of magnesium liquid, resulting in the contact between magnesium and air, continuous combustion, and the formation of more oxidized slag inclusion. In addition, the slag inclusion at the bottom of the furnace will be continuously turned upward during the stirring process of the stirring rod, resulting in low consistency of the performance and chemical composition of the production materials, the composition uneven and low yield; the standing precipitation process of molten slag takes a long time and has low efficiency; workers have low efficiency and high labor intensity.

SUMMARY

Aiming at the prior art, the disclosure aims to provide a magnesium alloy material smelting device, which can prevent the molten slag from turning up while accelerating diffusion by stirring, and shorten the standing precipitation time.

In order to achieve the above purpose, the present disclosure provides the following technical solution:

A magnesium alloy material smelting device, comprising a furnace, a disc packing device, the disc packing device comprising a stirring shaft, a packing basket, a disc stirring head, the stirring shaft connected with a packing basket, the bottom of the packing basket connected with a disc stirring head, the disc stirring head comprising a plurality of stirring wings, the stirring wings connected with the packing basket and the stirring disc, the connecting ends of the stirring wings connected with each other, the stirring ends extending to the edge of the stirring disc to stir the magnesium alloy solution, and the side wall of the packing basket provided with a liquid passage hole to form liquid exchange with the solution outside the packing basket.

In some embodiments, the stirring wings are of a right-angled trapezoidal structure, wherein the bevel edge is of concave arc shape.

In some embodiments, the stirring wing is an arc-shaped surface from the connecting end to the stirring end, and the tangential direction of the stirring end and the tangential direction of the connecting end have an included angle $\theta$.

In some embodiments, the included angle $\theta$ is 30°-45°.

In some embodiments, the stirring disc is disc-shaped and has a diameter of 2-3 times that of the packing basket.

In some embodiments, the stirring wings are four, and each adjacent stirring wing is connected perpendicularly to each other.

In some embodiments, the disc packing device further includes a partition plate that divides the packing basket into a plurality of packing bins.

In some embodiments, the partition plates are uniformly arranged in four, dividing the packing basket into 4 packing bins.

In some embodiments, the bottom of the packing basket is also uniformly provided with liquid passage holes.

In some embodiments, the disc packing device is made of iron and steel material.

Compared with the prior art, the present disclosure has the advantages that:

according to the disclosure, pure metal blocks and master alloys with a large amount can be uniformly delivered at one time, and isolated from the air after being added without destroying the surface covering layer, and the added alloy is melted and diffused through the packing basket. During preparing and processing magnesium alloy, the disc stirring head may accelerate the diffusion, and the rotation of the disc stirring head may divide the melt into upper and lower layers, and the upper melt forms a solution vortex to accelerate the diffusion of master alloy elements; the lower layer melt keeps relatively static, so as to avoid upturning of precipitated melt slag, thereby shortening the precipitation time of melt slag and improving productivity. The magnesium alloy prepared by the disclosure has uniform distribution of performance and chemical composition and high consistency, which ensures the standardization of materials and reduces artificial random factors, therefore the prepared alloy material may better meet the material design requirements.

Figure 1:
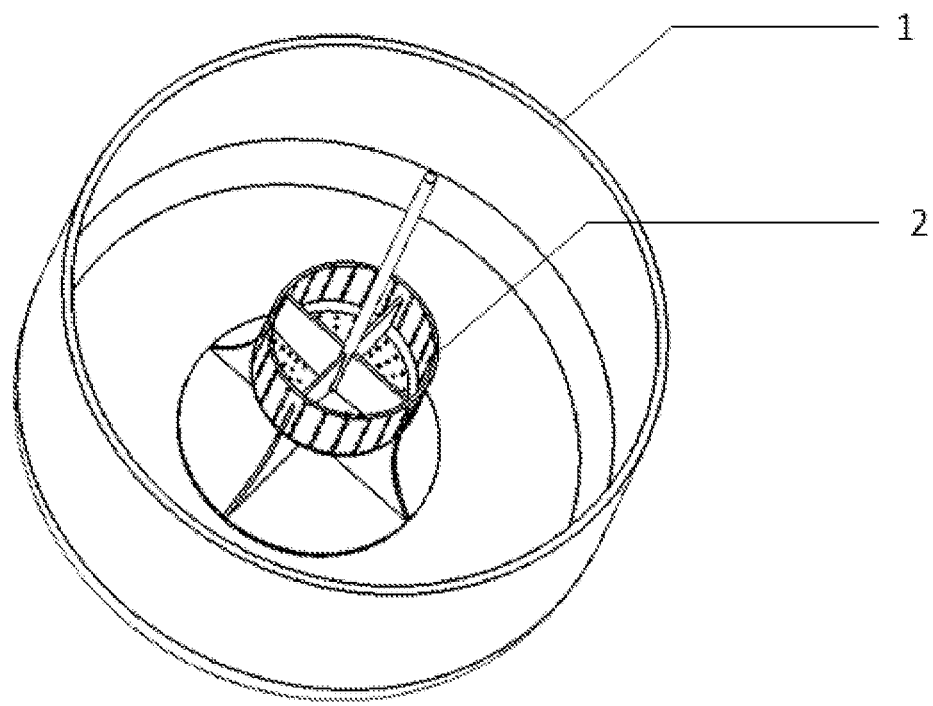
FIG. 1 is a structural schematic diagram of a magnesium alloy material smelting device of the present disclosure.

In the drawing: 1—furnace, 2—disc packing device, 3—stirring shaft, 4—partition plate, 5—packing basket, 6—liquid through hole, 7—disc stirring head, 8—stirring wing, 9—stirring disc, 81—connecting end, 82—stirring end.

DETAILED DESCRIPTION

It should be noted that the embodiments in the present disclosure and the features in the embodiments can be combined with each other without conflict.

A clear and complete description of the technical aspects of the present disclosure will be given below with reference to the accompanying drawings and in conjunction with embodiments which will be apparent to us that the described embodiments are only part of and not all of the embodiments of the present disclosure. Based on the embodiments in the present disclosure, all other embodiments obtained by those of ordinary skill in the art without making creative efforts are within the scope of protection of the present disclosure.

A magnesium alloy material smelting device according to an embodiment of the present disclosure is described below with reference to drawings 1-6 and in conjunction with embodiments.

Figure 2:
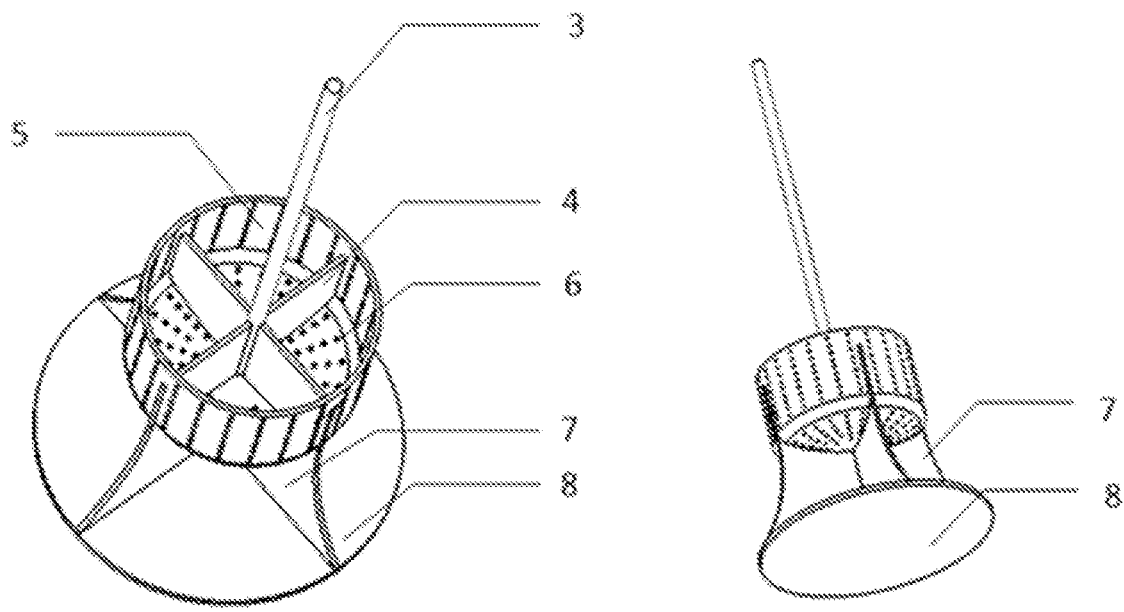
FIG. 2 is a structural schematic diagram of a disc packing stirring device in the first embodiment of the magnesium alloy material smelting device of the present disclosure.
Figure 3:
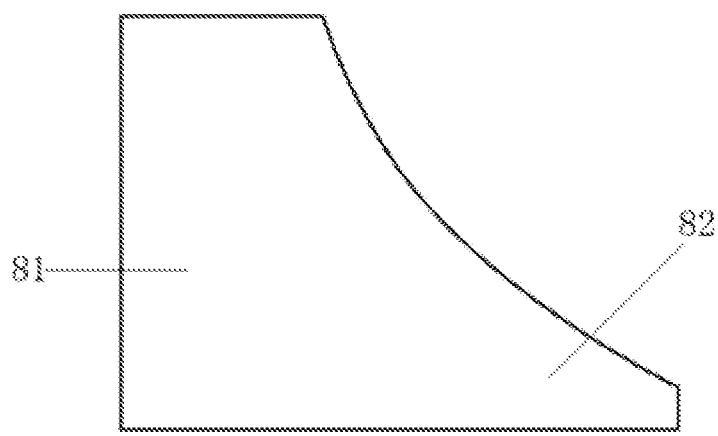
FIG. 3 is a front view of a stirring wing of a first embodiment of a magnesium alloy material smelting device of the present disclosure.

FIG. 1-3 shows a first embodiment of the present disclosure. A smelting device for magnesium alloy material comprises a smelting furnace 1 and a disc packing device 2, the disc packing device 2 comprising a stirring shaft 3, a packing basket 5, a disc stirring head 7, a partition plate 4 and a liquid through hole 6; the stirring shaft 3 connected with a packing basket 5, the bottom of the packing basket 5 connected with a disc stirring head 7, the disc stirring head 7 comprising a plurality of stirring wings 8, the upper end of the stirring wings 8 connected with the bottom of the packing basket 5, and the lower end connected with a stirring disc 9, the stirring disc 9 is disc shaped and the diameter is 2-3 times that of the packing basket 5; the stirring wing 8 divided into a connecting end 81 and a fixed end, the connecting ends 81 connected to each other at the central axis of the packing basket 5, the stirring end 82 extending out of the packing basket 5 and placed at the edge of the stirring disc 9 for driving the stirring of the magnesium alloy solution. In this embodiment, there are four stirring wings 8 distributed uniformly at the bottom of the packing basket 5, and the stirring wing 8 is shaped as a right-angled trapezoidal disc, wherein the bevel edge is concave arc shape, which can ensure the stability of stirring, the stirring shaft 3 extends the packing basket 5 and the disc stirring head 7 into the smelting furnace 1 and enters the aluminum alloy melt. In order to ensure uniform diffusion during the stirring process, the packing basket 5 is preferably a cylinder, and of course it may also be other structures that may meet the requirements of packing; a plurality of partition plates 4 are arranged in the packing basket 5 according to the amount of metal blocks and master alloys to be added, and the partition plates 4 divide the packing basket 5 into a plurality of packing bins, so that the master alloys are placed uniformly, the consistency of alloy melting is ensured, and at the same time, the wear of stirring device is not caused by the deviation of the master alloys to the same side due to centrifugation. In this embodiment, preferably, the partition plate 4 comprises four partition plate and divides uniformly the packing basket 5 into four packing bins, and the outer wall of the packing basket 5 and the bottom of the packing basket 5 are provided with liquid passage holes 6 for ensuring the flow exchange of solution inside and outside the packing basket 5. In order to avoid the influence of long-term use of high temperature on the stirring head and the packing basket 5, the disc packing device 2 is made of iron and steel material.

Figure 4:
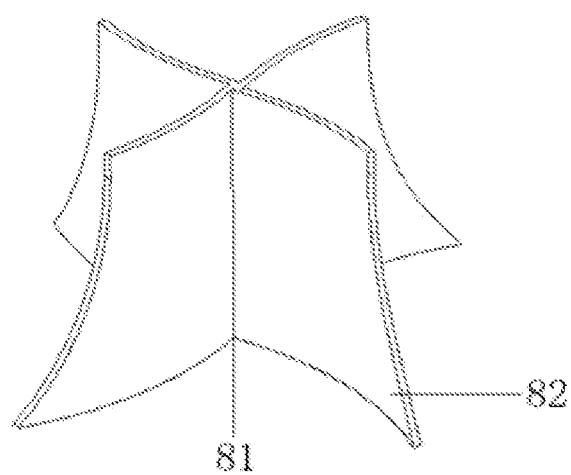
FIG. 4 is a perspective view of a stirring wing of a second embodiment of a magnesium alloy material smelting device of the present disclosure.
Figure 5:
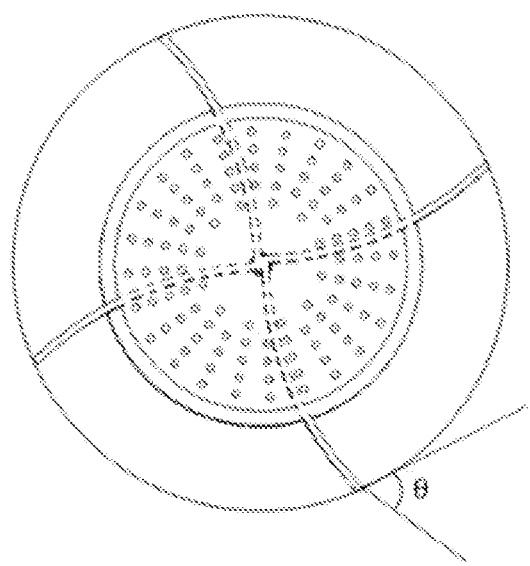
FIG. 5 is a top view of a disc packing stirring device in a second embodiment of a magnesium alloy material smelting device of the present disclosure.
Figure 6:
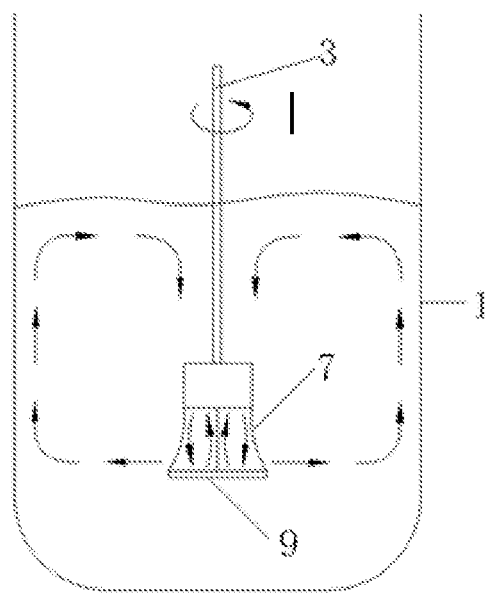
FIG. 6 is a schematic diagram of solution flow in a magnesium alloy material smelting device of the present disclosure.

The second embodiment of the present disclosure, as shown in FIGS. 4-5, is different from the first embodiment in that the plane of the stirring wing 8 is preferably an arc-shaped surface, the arc-shaped stirring wing 8 may reduce power consumption, the included angle between the tangential direction of the stirring end 82 and the tangential direction of the stirring disc 9 at the corresponding position is θ, and the angle θ is preferably 30°-45°, When the present disclosure is actually applied, firstly, the metal block of the required master alloy is uniformly added into the packing bin and the packing basket 5 is sunk into the magnesium solution along with the stirring head, so as to inject the magnesium solution into the packing bin by passing through the side wall of the packing basket 5 and the liquid passage hole 6 at the bottom, thereby slowly melting the added metal block. The disc stirring head 7 rotates and stirs to accelerate the diffusion of the melt of the master alloy through the liquid-passing hole 6, causing part of slag produced during the stirring process. Part of the slag with smaller diameter may flow into the magnesium alloy solution along with the liquid passage hole 6 and precipitate to the bottom layer of the solution after entering the magnesium alloy solution. At the moment, the stirring disc 9 may divide the molten liquid into upper and lower parts. The upper molten liquid forms a vortex under the stirring end 82 of the stirring wing 8 to accelerate the diffusion of the master alloy molten liquid, while the lower molten liquid is relatively static to ensure that the molten slag precipitated at the bottom does not turn upwards.

Different from aluminum, a loose oxide film forms on magnesium surface after magnesium is oxidized, and such oxide film may cause tensile stress on the metal surface and further oxidize and burn its lower part. Therefore, sprinkling flux and gas protection on the metal surface makes the surface film structure become dense and may prevent further oxidation and combustion.

Due to the disc design, the liquid moves axially upward and radially. When the radial movement encounters the furnace wall, it may move upward and downward along the furnace wall. Due to the centrifugal force of the packing basket 5, the liquid in the packing basket 5 may be in a critical motion state, which may lead to the upward moving liquid circulating and laminar flowing movement along the furnace wall and the stirring rod, and the oxide film formed on the surface may not be damaged during the laminar flowing movement of the liquid.

When the liquid moves upward along the stirring head axially and encounters the bottom of the packing basket 5, forming a small loop circulation, however, meanwhile it may be subject to the liquid circulation radially upward and back along the furnace wall, resulting in turbulence between the packing basket 5 and the disc, thereby forming a transitional mixing area in the vicinity of the packing basket 5, while laminar flowing movement still occurs in the area far away from the packing basket 5.

Impurities in the refining process of magnesium alloy may settle to the bottom of the furnace due to high density, and the baffle of stirring wing 8 prevents the impurities in the bottom of the furnace from rolling up and mixing into the circulating flow of the solution again when stirring. At the same time, the liquid moving downward in radial direction against the furnace wall cancels out each other, leading to fail to form a cycle, thereby forming a liquid-flow dead zone.

Magnesium alloy solution easily reacts with oxygen and water vapor etc. in the air, while a dense oxide film formed on the surface of magnesium liquid during the melting process may prevent further oxidation of magnesium liquid. Due to the cutter head design, the stirring head moves axially and radially under the action of the impeller rotating at high speed. The bottom of the packing basket 5 acts as a baffle disc to prevent the liquid from moving axially upward. When the liquid flows downward along the axial direction causing by the axial partial velocity, it comes back rotary grout along the furnace wall when flowing to the bottom of the furnace. When the liquid flows along the circumferential direction causing by the radial partial velocity, it is divided into upward flow and downward flow when encountering the furnace wall. The radial downward part of the liquid form turbulence when meeting the liquid generated by the axial return to the furnace wall. However, the radial upward part of the liquid moves upward along the furnace wall in a steady flow, which may not generate swirling phenomenon, so it may not destroy the dense oxide film formed on the surface, while it may quickly drive the slag inclusion of magnesium liquid to gather upward to achieve rapid slag removal.

Due to vortex only formed on the upper part of the stirring disc 9, it will not damage the covering film formed on the surface of the magnesium alloy, prevent the intervention of air during the smelting process, and may not affect the molten slag below the stirring disc 9, effectively preventing the molten slag below the stirring disc 9 from being involved in the solution again. The flow direction of the magnesium liquid is parallel to the stirring shaft 3, and the magnesium liquid is pushed by the stirring wing 8 and flows downward to the plane of the stirring disc 9 driven by the disc stirring head 7 and turns upward after encountering the stirring disc 9 to form an upper and lower circulating flow. Due to its own rotation, mechanical energy is transferred to liquid, causing forced convection of liquid in the furnace. Due to the master alloy in the packing bin is affected by centrifugal force, the melted liquid droplets mixes fully with the magnesium solution and diffused outward through the liquid passage hole 6, meanwhile, the liquid flow formed by the rotation of the disc stirring head 7 may quickly circulate the mixed liquid in the packing basket 5 and its vicinity until dispersing to other positions, resulting in the formation of alloy concentration gradient in the vicinity of the packing basket 5, which in turn promotes the faster melting of the master alloy block in the packing basket 5 to form the concentration balance of the mixed solution. Meanwhile, the flow velocity of the mixed liquid thrown out by the packing basket 5 is different from that driven by the stirring head, such that the liquid at the junction of the two is strongly shearing. In addition, the magnesium solution at the top of the packing basket 5 quickly replenishes the gap left by the mixed solution passing through the liquid hole 6 by centrifugation, and continues to scour the master alloy until all the master alloy blocks in the packing bin are melted to the magnesium solution and diffused uniformly.

Compared with the prior art, the present disclosure has the advantages that:

according to the disclosure, pure metal blocks and master alloys with a large amount can be uniformly delivered at one time, and isolated from the air after being added without destroying the surface covering layer, and the added alloy is melted and diffused through the packing basket. During preparing and processing magnesium alloy, the disc stirring head may accelerate the diffusion, and the rotation of the disc stirring head may divide the melt into upper and lower layers, and the upper melt forms a solution vortex to accelerate the diffusion of master alloy elements; the lower layer melt keeps relatively static, so as to avoid upturning of precipitated melt slag, thereby shortening the precipitation time of melt slag and improving productivity. The magnesium alloy prepared by the disclosure has uniform distribution of performance and chemical composition and high consistency, which ensures the standardization of materials and reduces artificial random factors, therefore the prepared alloy material may better meet the material design requirements.

Although embodiments of the present disclosure have been shown and described, it will be understood to those of ordinary skill in the art that various variations, changes, substitutions and modifications may be made to these embodiments without departing from the principle and spirit of the disclosure, the scope of which is defined by the appended claims and their equivalents.

What is claimed is:

1. A magnesium alloy material smelting device, comprising a furnace, a disc packing device, wherein the disc packing device comprises a stirring shaft, a packing basket, a disc stirring head, the stirring shaft connected with the packing basket, the bottom of the packing basket connected with the disc stirring head, the disc stirring head comprising a plurality of stirring wings, the stirring wings connected with the packing basket and the stirring disc, connecting ends of the stirring wings connected with each other, stirring ends of the stirring wings extending to an edge of the stirring disc to stir magnesium alloy solution, and a side wall of the packing basket provided with a liquid passage hole to exchange liquid with the solution outside the packing basket, wherein the stirring wings are of right-angle trapezoidal structure with a bevel edge of concave arc shape.

2. A magnesium alloy material smelting device according to claim 1, wherein respective surfaces of the stirring wings from the connecting end to the stirring end are arc-shaped, and an included angle between a tangential direction of the stirring end and a tangential direction of the stirring disc at the corresponding position is θ.

3. A magnesium alloy material smelting device according to claim 2, wherein the included angle θ is 30°-45°.

4. A magnesium alloy material smelting device according to claim 3, wherein the number of stirring wings is four, and each adjacent stirring wing is vertically connected with each other.

5. A magnesium alloy material smelting device according to claim 1, wherein the stirring disc is disc-shaped and has a diameter 2-3 times that of the packing basket.

6. A magnesium alloy material smelting device according to claim 1, wherein the disc packing device further comprises partition plates dividing the packing basket into a plurality of packing bins.

7. A magnesium alloy material smelting device according to claim 6, wherein the partition plates are uniformly arranged in four, and the packing basket is divided into four packing bins.

8. A magnesium alloy material smelting device according to claim 1, wherein the bottom of the packing basket is also uniformly provided with liquid passage holes.

9. A magnesium alloy material smelting device according to claim 1, wherein the disc packing device is made of iron and steel material.

* * * * *